(12) United States Patent
Lorenzo et al.

(10) Patent No.: US 11,176,311 B1
(45) Date of Patent: Nov. 16, 2021

(54) ENHANCED SECTION DETECTION USING A COMBINATION OF OBJECT DETECTION WITH HEURISTICS (71) Applicant: International Business Machines Corporation, Armonk, NY (US)

(72) Inventors: Mario J. Lorenzo, Miami, FL (US); Scott Carrier, New Hill, NC (US); Paul Lewis Felt, Springville, UT (US); Brendan Bull, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/924,284

(22) Filed: Jul. 9, 2020

(51) Int. Cl.
*G06T 11/60* (2006.01)
*G06F 40/117* (2020.01)

(52) U.S. Cl.
CPC .................. *G06F 40/117* (2020.01)

(58) Field of Classification Search
CPC .................................. G06F 40/117
USPC ....................................... 715/243
See application file for complete search history.

(56) References Cited

U.S. PATENT DOCUMENTS

| | | | | |
|---|---|---|---|---|
| 5,765,176 A | * | 6/1998 | Bloomberg | G06T 11/00 345/634 |
| 6,000,612 A | * | 12/1999 | Xu | G06K 7/10722 235/454 |
| 9,241,004 B1 | * | 1/2016 | April | H04L 67/42 |
| 9,245,205 B1 | * | 1/2016 | Soldevila | G06K 9/00852 |
| 9,443,192 B1 | | 9/2016 | Oosic | |
| 9,489,354 B1 | * | 11/2016 | Lee | G06F 40/166 |
| 10,210,434 B1 | | 2/2019 | Oosic | |
| 10,592,822 B1 | | 3/2020 | Oosic | |
| 10,824,790 B1 | * | 11/2020 | LeCounte | G06K 9/00463 |
| 2004/0145593 A1 | * | 7/2004 | Berkner | G06T 11/60 345/619 |
| 2007/0050712 A1 | * | 3/2007 | Hull | G06F 40/106 715/234 |
| 2007/0201752 A1 | * | 8/2007 | Gormish | G06K 9/00442 382/232 |
| 2007/0294614 A1 | * | 12/2007 | Jacquin | G06F 40/14 715/230 |
| 2009/0161955 A1 | * | 6/2009 | Isshiki | G06K 9/348 382/177 |

(Continued)

OTHER PUBLICATIONS

Anonymous, "Recognizing Semantic Formatting Information in a Document," An IP.com Prior Art Database Technical Disclosure, IPCOM00251990D, Dec. 13, 2017, 35 pages.

(Continued)

*Primary Examiner* — Hassan Mrabi
(74) *Attorney, Agent, or Firm* — Cantor Colburn LLP; Ryan Lewis (57) ABSTRACT

Aspects of the invention include converting text from a first image file into a first machine-encodable text, wherein the image file includes a first section of text that is offset from a second section of text. Analyzing the first image file to detect a position of the first section of text. Embedding a first section of the first machine encodable-text with metadata describing the position of the first section of text. Reformatting the first section of the first machine encodable-text to conform to the position of the first section of text.

17 Claims, 7 Drawing Sheets

(56) References Cited

U.S. PATENT DOCUMENTS

| | | | | |
|---|---|---|---|---|
| 2010/0174732 A1* | 7/2010 | Levy | | G06F 40/10 |
| | | | | 707/768 |
| 2012/0102388 A1* | 4/2012 | Fan | | G06F 40/117 |
| | | | | 715/234 |
| 2013/0163873 A1* | 6/2013 | Qingjie | | G06F 40/117 |
| | | | | 382/176 |
| 2015/0161086 A1* | 6/2015 | Wu | | G06F 3/04842 |
| | | | | 715/234 |
| 2015/0227514 A1* | 8/2015 | Gillett | | G06Q 10/101 |
| | | | | 707/608 |
| 2015/0242684 A1* | 8/2015 | Arad | | G06F 16/9554 |
| | | | | 382/176 |
| 2016/0203625 A1* | 7/2016 | Khan | | G06K 9/2081 |
| | | | | 345/636 |
| 2016/0275092 A1* | 9/2016 | Black | | G06F 3/0484 |
| 2018/0189604 A1* | 7/2018 | Zhang | | G06K 9/469 |
| 2018/0336972 A1* | 11/2018 | Carbonell | | G06F 40/30 |
| 2019/0180154 A1* | 6/2019 | Orlov | | G06N 3/082 |
| 2019/0251163 A1* | 8/2019 | Bellert | | G06F 40/169 |
| 2019/0361856 A1* | 11/2019 | Chen | | G06F 16/2228 |
| 2020/0134005 A1* | 4/2020 | Mitra | | G06F 16/316 |
| 2020/0151503 A1* | 5/2020 | Wang | | G06K 9/6202 |
| 2020/0257755 A1* | 8/2020 | Staar | | G06F 40/123 |
| 2021/0109717 A1* | 4/2021 | Voicu | | G06F 8/38 |
| 2021/0125034 A1* | 4/2021 | Nguyen | | G06K 9/4628 |

OTHER PUBLICATIONS

Anonymous, "Semi-Supervised Classification Using Object Metadata," An IP.com Prior Art Database Technical Disclosure, IPCOM000252345D, Jan. 5, 2018, 34 pages.

Argarwal et al., "Recent Advances in Object Detection in the Age of Deep Convolutional Neural Networks," hal-01869//9, Aug. 16, 2019, 105 pages.

Gu et al., "Recent Advances in Convolutional Neural Networks," Nanyang Technological University, Oct. 19, 2017, 38 pages.

Jiao et al., "A Survey of Deep Learning-Based Object Detection," IEEE, Oct. 10, 2019, pp. 1-30.

Wu et al., "Recent Advances in Deep Learning for Object Detection," School of Information System, Salesforce Research Asia, Aug. 10, 2019, 40 pages.

* cited by examiner

ENHANCED SECTION DETECTION USING A COMBINATION OF OBJECT DETECTION WITH HEURISTICS

BACKGROUND

The present invention generally relates to programmable computing systems, and more specifically, to enhanced section detection using a combination of object detection with heuristics.

Information retrieval computing systems can receive search queries from a user and provide answers back to the user. In information retrieval, a question answering (QA) system is tasked with automatically answering a question posed in natural language to the system. A QA system can retrieve an answer by searching a data corpus for documents matching the search query. To assist the QA system, the documents are annotated to describe relationships between co-existing entities. The process of annotating documents is performed by subject matter experts who review the documents and determine whether any entities in the documents can be annotated. The annotations assist the QA system to retrieve the best documents to answer the search query.

SUMMARY

Embodiments of the present invention are directed to object detection with heuristics. A non-limiting example computer-implemented method includes converting text from a first image file into a first machine-encodable text, wherein the image file includes a first section of text that is offset from a second section of text. Analyzing the first image file to detect a position of the first section of text. Embedding a first section of the first machine encodable-text with metadata describing the position of the first section of text. Reformatting the first section of the first machine encodable-text to conform to the position of the first section of text.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide computer-implemented methods and computing systems that receive a scanned image of an original text document and convert the image into machine-encodable text that has a same layout as the original text document.

Information retrieval systems are operable to receive a search query and, in response, analyze structured data to retrieve an answer to the query. The structured data can be in the form of annotated electronic documents organized in a corpus. The annotations are extra information that describe various tokens and relationships between tokens found in the electronic documents. In many instances, the annotations are in the form of metadata and not visible to an end-user. In response to a search query, the information retrieval can retrieve an electronic document that potentially answers the query. The information retrieval system can retrieve the electronic documents based on keywords found in the text of the documents. The information retrieval system can further analyze the information contained in the documents by analyzing the annotations embedded in the documents.

The electronic documents are annotated using natural language processing techniques that identify the different sections in the text and insert annotations to describe the respective text of the sections. Many of the documents are originally paper documents that are scanned and digitized into electronic format. The electronic documents can be processed using optical character recognition (OCR) to convert the scanned text image into plain text or rich text. A plain text document only includes text without any special formatting. Rich-text document includes text with formatting, such as bold, text-size underlining, and the like. The electronic documents can further be processed to recreate electronic documents that resemble the original paper documents. For example, natural language processing techniques apply text analysis methods and rules to detect section headers and predict the beginning and sending of document sections. However, the conventional process does not result in electronic documents that resemble the original paper documents. Sections can be occluded due to graphics and colors used in an original document. In other instances, sections are not identified due to the lack of a section header or unknown header. These instances can result in multiple sections from the original paper document being converted into a single section in the electronic document. As a result, the subject matter expert has an electronic document that is not properly divided into segments. This results in a more laborious annotation process.

One or more embodiments of the present invention address one or more of the above-described shortcomings by providing computer-implemented methods and computing systems the convert text from a document image into machine-encodable text. The document image is also processed to identify different sections and their layout in the document image. Descriptions of the sections are embedded with the machine-encodable text as metadata. The machine-encodable text is reformatted such that the layout of sections conform to the layout of the sections in the document image.

Figure 1:
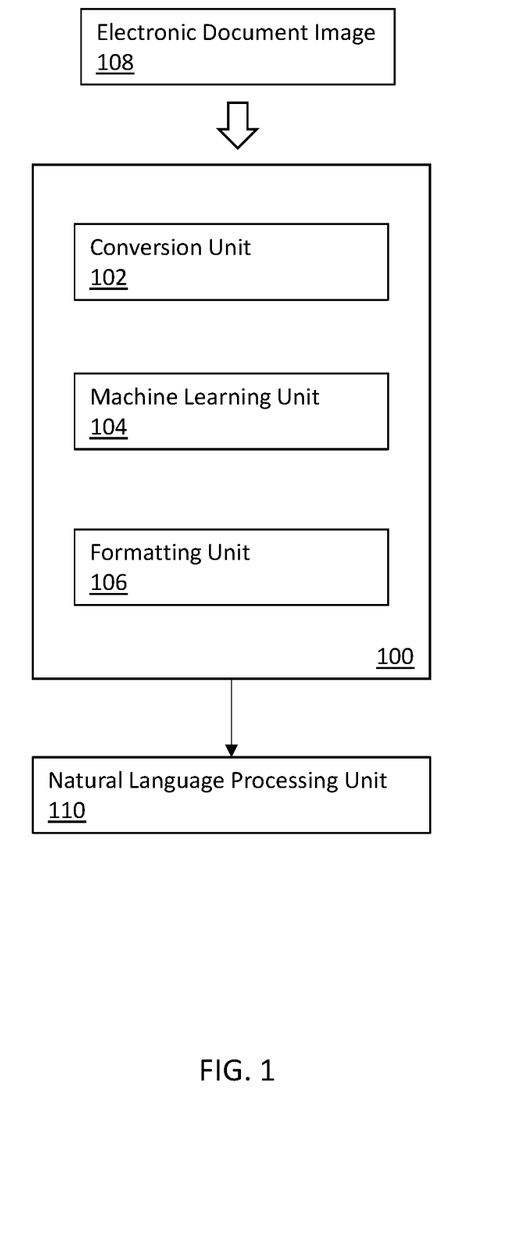
FIG. 1 illustrates a block diagram of a system for enhanced section detection in accordance with one or more embodiments of the present invention.

Turning now to FIG. 1, a system 100 for enhanced section detecting is generally shown in accordance with one or more embodiments of the present invention. The system 100 includes a conversion unit 102 for receiving a document image and converting any text found in the image into a machine-encodable text, for example, plain text. The system 100 further includes a machine learning unit 104 that is trained to detect objects in the image. The objects include sections (e.g., blocks of text, paragraphs, bullet points) found in the document image. The system 100 further includes a formatting unit 106 for embedding the machine-encodable text file with metadata that describes the layout of the detected objects.

The conversion unit 102 is operable to receive an electronic document image 108 and convert the text found in the document image 108 to machine-encodable text. In some embodiments of the present invention, the conversion unit 102 can use optical character recognition (OCR) to perform the conversion. In general, the conversion unit 102 can receive the document image 108 or a bitmap describing the image and identify dark and light areas. The conversion unit 102 can further analyze the dark areas for the presence of alphanumeric characters (text). The conversion unit 102 can apply various methods to determine if the dark area contains any text. For example, the conversion unit 102 can use pattern recognition, in which the conversion unit 102 can compare and recognize the shapes formed by the dark areas with example alphanumeric characters in different fonts and font sizes. The conversion unit 102 can also apply feature detection, in which the conversion unit 102 can be trained to recognize different features such as a number of curves or arrangement or curved and straight lines. For example, the letter "P" can be a combination of a straight line and an arc at one end of the straight line. Once an alphanumeric character is recognized, it can be converted to an encoding standard such as the American Standard Code for Information (ASCII) or other appropriate encoding standard based upon language and geographic location. A computing system can read the ASCII code for the alphanumeric character and generate the corresponding letter or number. Once the conversion unit 102 has identified each alphanumeric character in the image, it can convert the text from the image into machine-encodable text, such as a plain text or a rich text format.

The machine learning unit 104 can further extract features and analyze the features to determine the boundaries of different sections in the document image 108. In some embodiments of the present invention, the machine learning unit can include a convolutional neural network-based classifier. For example, the machine learning unit 104 can use a Regional Convolutional Neural Network (R-CNN). The R-CNN can receive document image 108 and detect objects contained therein. The objects include different sections of the document, including but not limited to paragraphs of text, figures, bullet points, titles, conclusions, and other natural sections of a document. In some embodiments of the present invention, the R-CNN first generates bounding boxes in document image 108 to find candidate sections and runs a classifier on each bounding box. The R-CNN further determines a location and dimension of each bounding box. The R-CNN analyzes the extracted features to determine whether a bounding box encapsulates one or more sections. The R-CNN can be trained to detect features that suggest distinct text blocks. The features can include offsets between text blocks, underlined or bolded words at the beginning of a text block, spacing, punctuation, capitalized strings of text, graphical indicator (e.g., box surrounding text), formatting (e.g., bolding, underlining), or other appropriate features. Upon classification of different objects, the R-CNN removes duplicate classifications and scores the boxes based on the other detected objects in the image. The highest scoring bounding boxes are classified as sections. The objects can take the form of geometric shapes that distinguish the different sections of the original document.

It should be appreciated that a classification type of object is not necessary for object detection. In some embodiments of the present invention, the machine learning unit 104 does recognize the alphanumeric characters at the beginning and end of the section encapsulated by a box. In other embodiments, each alphanumeric character in an image can be indexed, and the machine learning unit 104 recognizes and index number of the beginning and ending character of each text block. However, the machine learning unit 104 does not need to recognize the substance of each text block. In other words, the machine learning unit 104 does not need to describe the purpose or subject matter of an object. The purpose of subject matter can include but not be limited to a title block, patient medical history, diagnosis, or conclusion. Rather, the machine learning unit 104 detects the beginning and ending of distinct sections without deriving meaning from the sections.

The phrases "neural network" and "machine learning" broadly describes a function of electronic systems that learn from data. A machine learning system, engine, or module can include a machine learning algorithm that can be trained, such as in an external cloud environment (e.g., the cloud computing environment 50), to learn functional relationships between inputs and outputs that are currently unknown. In one or more embodiments, machine learning functionality can be implemented using a machine learning unit 104, having the capability to be trained to perform a currently unknown function. In machine learning and cognitive science, neural networks are a family of statistical learning models inspired by the biological neural networks of animals, and in particular, the brain. Neural networks can be used to estimate or approximate systems and functions that depend on a large number of inputs.

The machine learning unit 104 can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in the machine learning unit 104 that carry electronic messages between simulated neurons are provided with numeric weights that correspond to the strength or weakness of a given connection. During training, The weights can be adjusted and tuned based on experience, making the machine learning unit 104 adaptive to inputs and capable of learning. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

The formatting unit 106 is operable to map the objects detected by the machine learning unit 104 back on to the machine-encodable text generated by the conversion unit 102. The formatting unit 106 receives data describing each object from the machine learning unit 104 and encodes the machine-encodable text with metadata describing each object. The metadata respectively describes the boundaries and location of each section. The boundaries and location can be in relation to each other sections, a perimeter of the original document, or both. The formatting unit 106 reformats the machine-encodable text such that the layout of the sections conforms to the layout of the sections in the document image 108. The formatting unit 106 detects the beginning alphanumeric character and the ending alphanumeric character of a text block in a section. The formatting unit 106 arranges the location of the sections. This results in the machine-encodable text having the same layout as arranged in the document image 108.

The system is further operable to transmit the reformatted machine-encodable text to a natural language processing (NLP) unit 110. The NLP unit 110 can apply natural language processing techniques to semantically analyze the text, including determining entities to describe the text, and relationships between textual phrases. Based on the textual analysis and the identified segments, the NLP unit 110 can annotate the reformatted machine-encodable text with metadata.

The document image 108 can be a scanned image of a paper document, a portable document format (PDF) file, an image captured by an image capturing device, or other form of document image. The document image 108 can be an image of an original paper document, for example, a health care patient's medical records.

Figure 2:
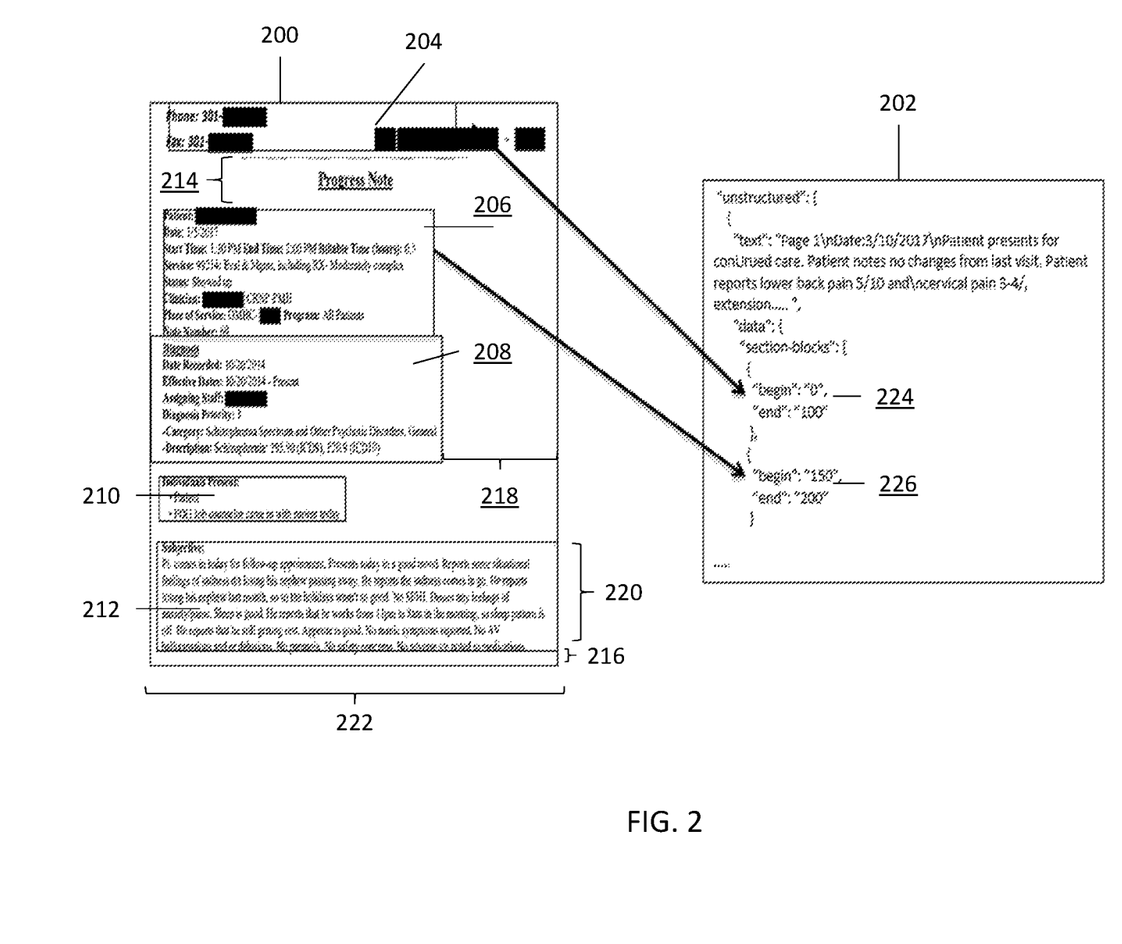
FIG. 2 illustrates a document image and associated metadata in accordance with one or more embodiments of the present invention.

Referring to FIG. 2, a document image 200 and generated metadata are shown 202. The document image 200 has been analyzed the machine learning unit 104 and first, second, third, fourth, and fifth bounding boxes 204 206 208 210 212 have been illustrated for convenience. Each bounding box 204 206 208 210 212 illustrates a boundary of a respective section. The machine learning unit 104 can determine a vertical offset 214 between one edge of a bounding box and another edge of another bounding box. The machine learning unit 104 can also determine a vertical offset 216 between one edge of any bounding box and an edge of the document image 200. The machine learning unit 104 can also determine a horizontal offset 218 between an edge of a bounding box and an edge of the document image 200. The machine learning unit 104 can also determine a horizontal offset (not shown) between one edge of a bounding box and an edge of another bounding box. For example, if two bounding boxes are arranged side by side on the document image 200. The machine learning unit 104 can also determine the dimensions of each bounding box. For example, the machine learning unit 104 can determine a height 220 and width 222 of each bounding box. Although not illustrated, the machine-encodable text would be reformatted such that the arrangement of the machine-encodable text would mimic the arrangement of the text in the document image 200.

Still referring to FIG. 2, an image of metadata 202 generated by the machine learning unit 104 is shown. As seen, the respective metadata 224 226 includes a beginning point and ending point for the first bounding box 204 and the second bounding box 206. In this illustration, the beginning of the first bounding box 204 is indicated as "0" and the end is indicated as "100". However, it should be appreciated that various techniques can be employed to designate a positioning and boundaries of any bounding box. This metadata is embedded into the machine-encodable text generated by the conversion unit 102.

In some instances, the machine learning unit 104 can determine that information is confidential and should not be transmitted. The machine learning unit 104 can be trained to determine certain documents can contain confidential information such as a patient's identity, security number, contact information, or other confidential information. For example, the machine learning unit 104 can be trained to detect a document potentially contains confidential information based on keywords, a document source, embedded metadata indicating the confidentiality of certain information, or other document feature. In these instances, the formatting unit 106 can replace the confidential information with a generic character such as a "#", mask the confidential information, or otherwise obfuscate the confidential information. In these instances, the formatting unit 106 can continue to reformat machine-encodable text as if the confidential information were present. Therefore, the layout of the machine encodable text appears the same as in the document image 200, but without the confidential information being readable.

Figure 3:
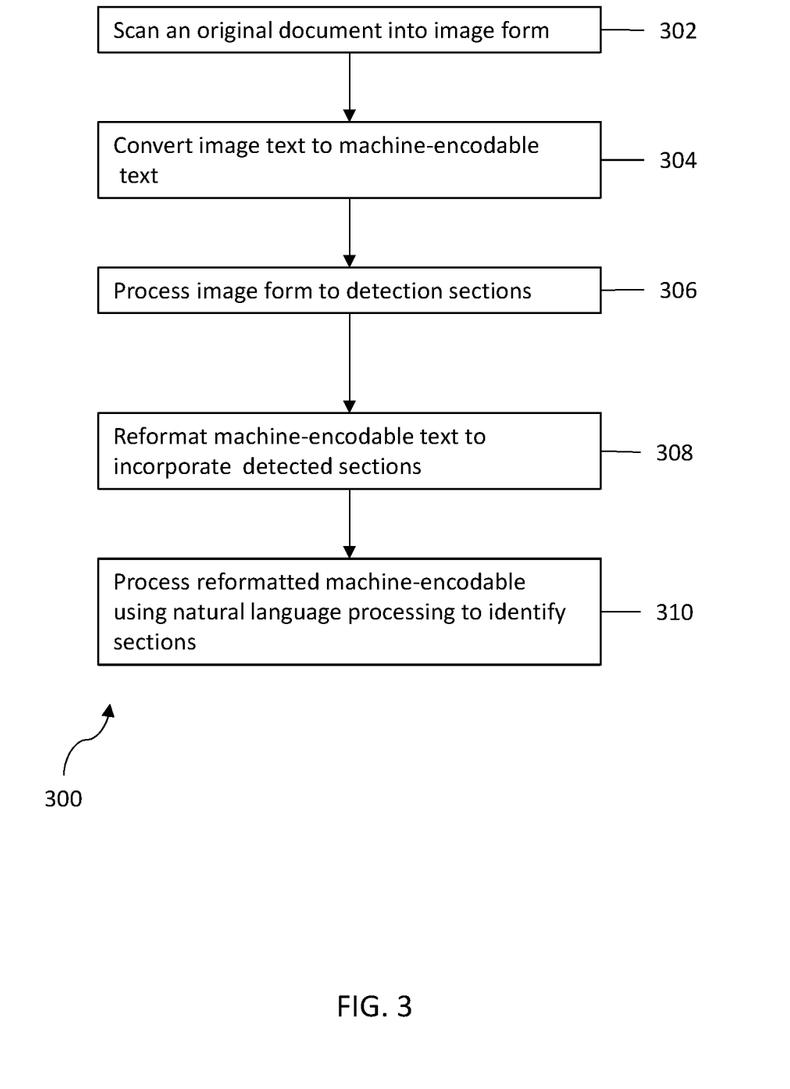
FIG. 3 illustrates a flow diagram of a process for enhanced section detection in accordance with one or more embodiments of the present invention.

Referring to FIG. 3, a flow diagram of a process 300 for enhanced section detection is shown. At block 302, an original document is converted into an image file. The image file can be converted to any appropriate image format. In some embodiments, the image format is selected based on a type of machine learning unit used to analyze the image file. The original document can be a paper document, for example, a document generated by word processing software, a healthcare journal article, a patient's medical file, doctor's notes, or other paper document.

At block 304, the image file is analyzed and the text of the image file is converted into machine-encodable text. The image file can be analyzed using optical character recognition (OCR) techniques. The text contained in the image can be converted to a machine-encodable text, such as plain text or rich text.

At block 308, the image file is analyzed to detect the boundaries of sections. In some embodiments, a neural network is employed to detect the section boundaries. The text blocks can include paragraphs, bullet points, or other appropriate sections. Once the boundaries of the sections are identified, metadata is generated to define the boundaries of each section. The metadata is embedded with the machine encodable text.

At block 310, the machine-encodable text is reformatted to have sections that have a layout to resemble the original document. For example, referring back to FIG. 2, the machine-encodable text would be reformatted such that the text encapsulated in the fourth bounding box is spaced apart from the text encapsulated in the fifth bounding box 210. Furthermore, the spacing would take into consideration the length of any vertical offsets 214 and horizontal offsets. In other words, the spacing of the between text blocks in the machine-encodable text is the same as the spacing between sections in the document image 108.

At block 312, the reformatted machine-encodable text is processed to determine an annotation describing each section. In some embodiments of the present invention, the reformatted machine-encodable text is processed using natural language processing techniques. The determined annotation can be embedded into the reformatted machine-encodable text as metadata.

Figure 4:
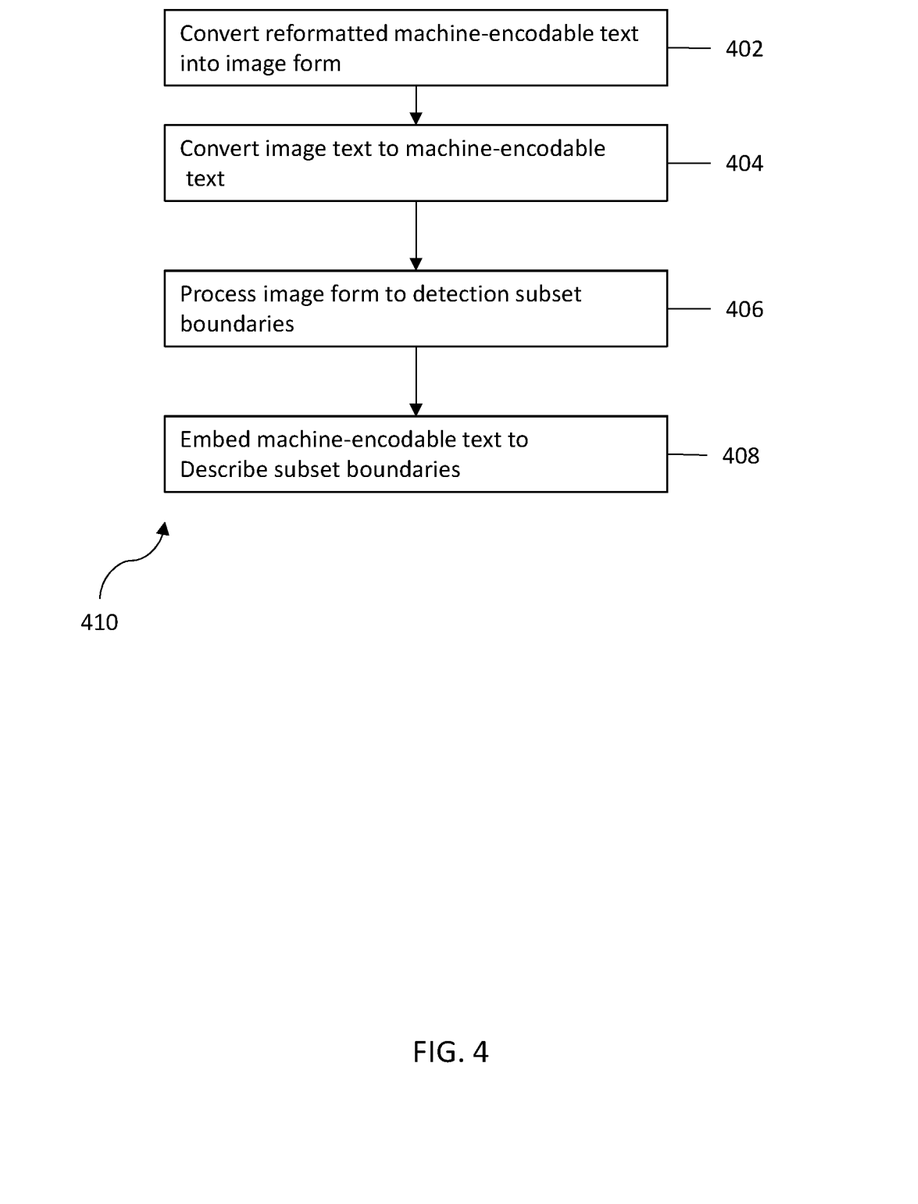
FIG. 4 illustrates a flow diagram of a process for subset boundary detection in accordance with one or more embodiments of the present invention.

Referring to FIG. 4, a flow diagram of a process 400 for subset boundary detection is shown. At block 402, a reformatted machine-encodable text is converted to an image document. In some embodiments of the present invention, each section is converted into a separate image file. In other embodiments, the entire machine-encodable text is converted into a single image file.

At block 404, the text of a section displayed in an image file is converted to machine-encodable text. The image file can be analyzed using optical character recognition (OCR) techniques. The text contained in the image can be converted to a machine-encodable text such as, plain text or rich text.

At block 406, the image file is analyzed to detect subset boundaries. As used herein, subsets include sentences, bullet points, phrases contained within a text block or other syntactically natural entity. In some embodiments, a neural network is employed to detect the subset boundaries. The neural network can be trained to perform semantic and syntactic analysis to determine the boundaries of the subset. Once the boundaries of the subset are identified, metadata is generated to define the boundaries of each subset. The metadata is embedded into the machine encodable text at block 408.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
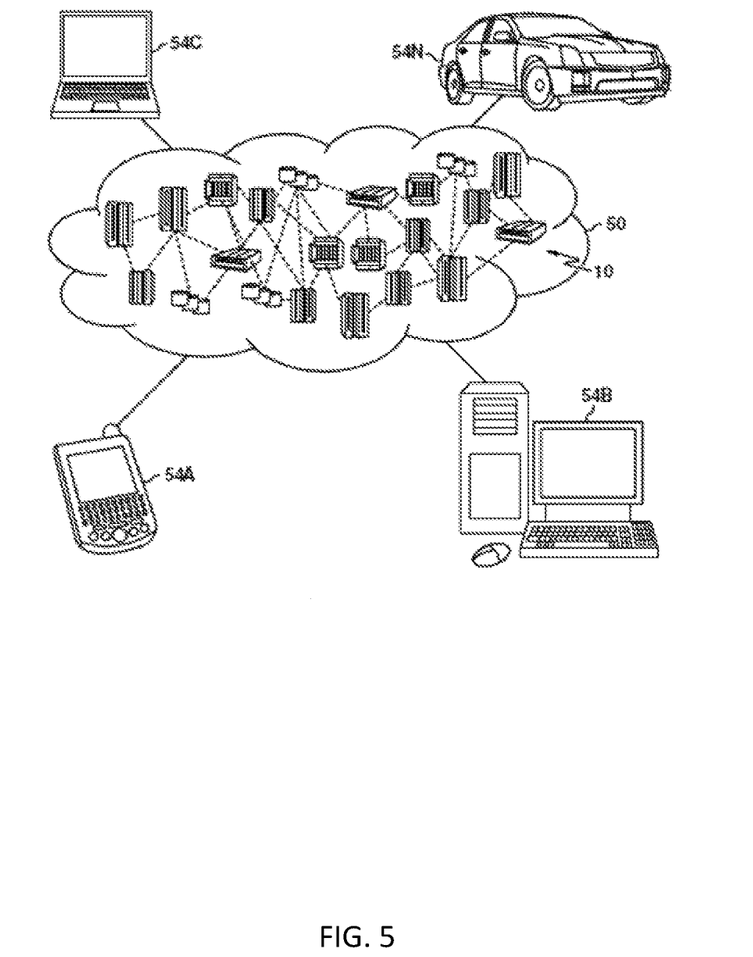
FIG. 5 illustrates a cloud computing environment according to one or more embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
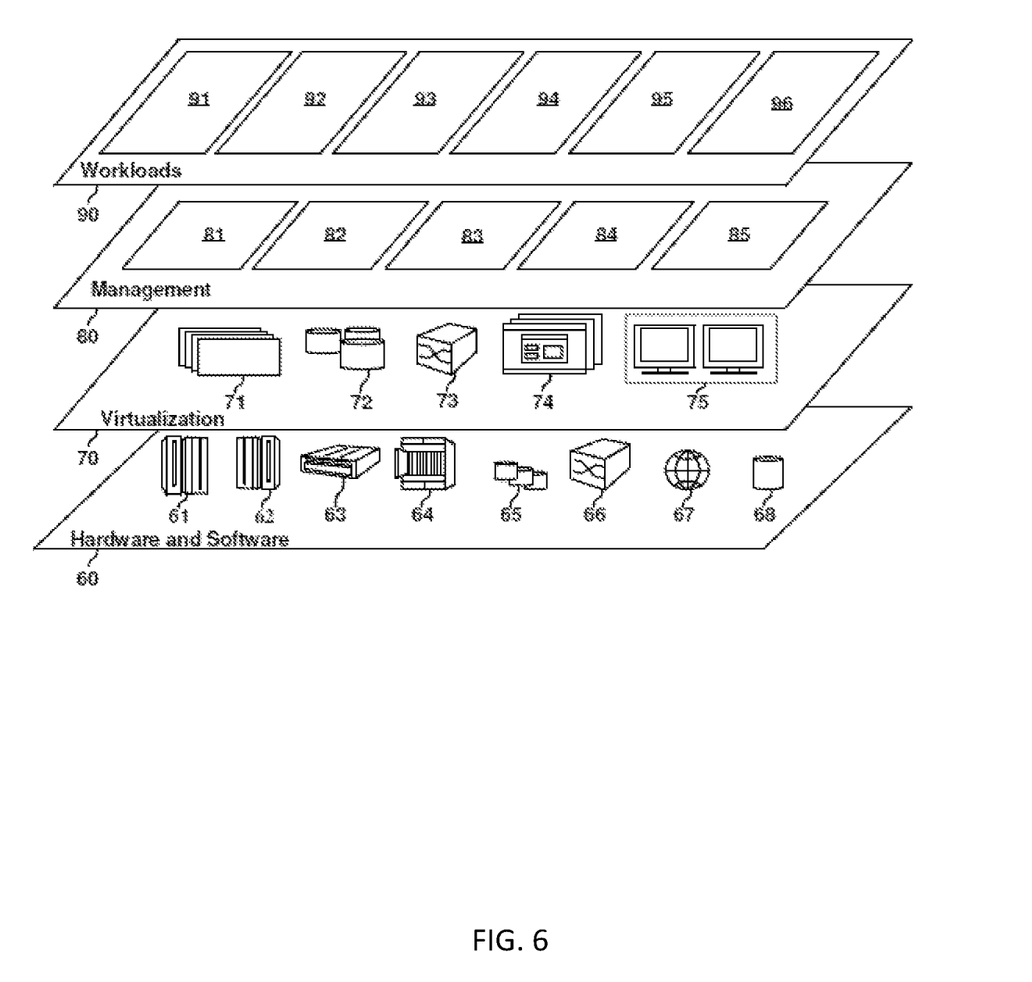
FIG. 6 illustrates abstraction model layers according to one or more embodiments of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and enhanced section detecting 96.

Figure 7:
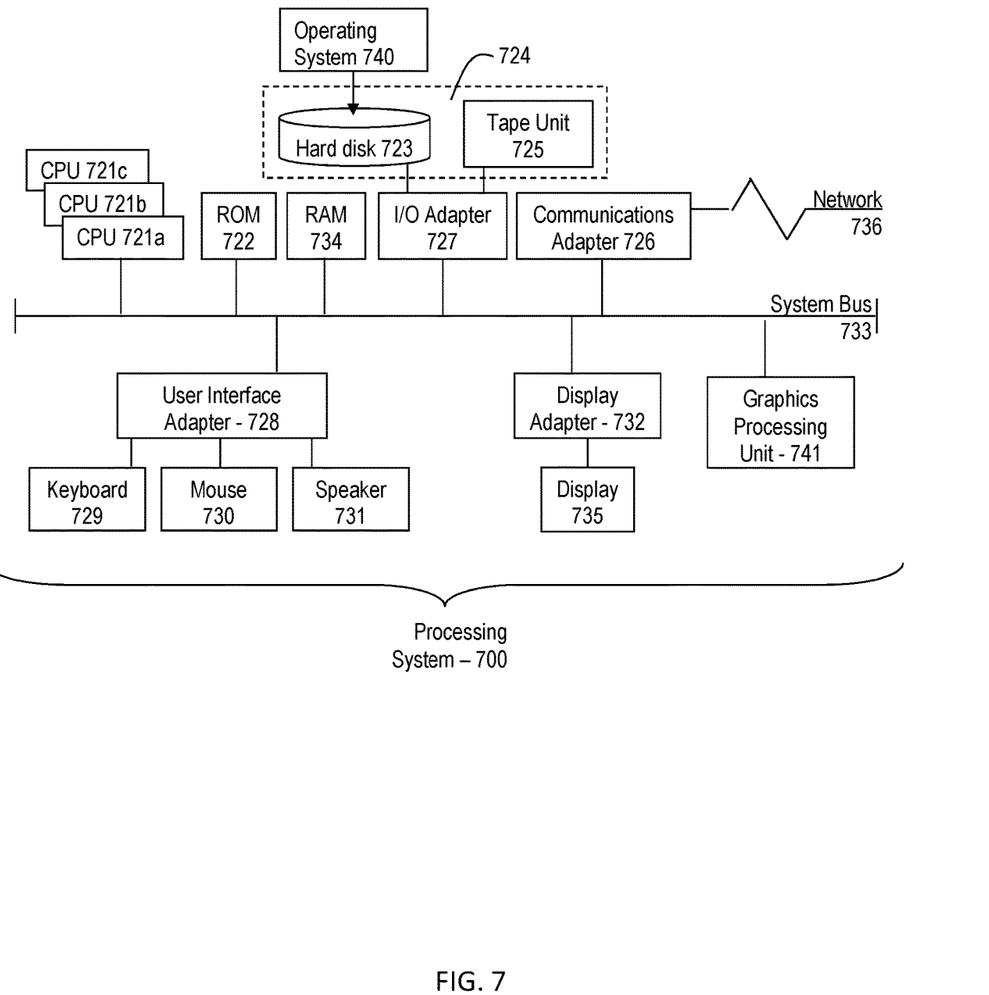
FIG. 7 illustrates a block diagram of a computer system for use in implementing one or more embodiments of the present invention.

It is understood that the present disclosure is capable of being implemented in conjunction with any other type of computing environment now known or later developed. For example, FIG. 7 depicts a block diagram of a processing system 700 for implementing the techniques described herein. In examples, the processing system 700 has one or more central processing units (processors) 721a, 721b, 721c, etc. (collectively or generically referred to as processor(s) 721 and/or as processing device(s)). In aspects of the present disclosure, each processor 721 can include a reduced instruction set computer (RISC) microprocessor. Processors 721 are coupled to system memory (e.g., random access memory (RAM) 724) and various other components via a system bus 733. Read only memory (ROM) 722 is coupled to system bus 733 and may include a basic input/output system (BIOS), which controls certain basic functions of the processing system 700.

Further depicted are an input/output (I/O) adapter 727 and a network adapter 726 coupled to the system bus 733. I/O adapter 727 may be a small computer system interface (SCSI) adapter that communicates with a hard disk 723 and/or a storage device 725 or any other similar component. I/O adapter 727, hard disk 723, and storage device 725 are collectively referred to herein as mass storage 734. Operating system 740 for execution on processing system 700 may be stored in mass storage 734. The network adapter 726 interconnects system bus 733 with an outside network 736 enabling processing system 700 to communicate with other such systems.

A display (e.g., a display monitor) 735 is connected to the system bus 733 by display adapter 732, which may include a graphics adapter to improve the performance of graphics intensive applications and a video controller. In one aspect of the present disclosure, adapters 726, 727, and/or 732 may be connected to one or more I/O busses that are connected to the system bus 733 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 733 via user interface adapter 728 and display adapter 732. An input device 729 (e.g., a keyboard, a microphone, a touchscreen, etc.), an input pointer 730 (e.g., a mouse, trackpad, touchscreen, etc.), and/or a speaker 731 may be interconnected to system bus 733 via user interface adapter 728, which may include, for example, a Super I/O chip integrating multiple device adapters into a single integrated circuit.

In some aspects of the present disclosure, the processing system 700 includes a graphics processing unit 737. Graphics processing unit 737 is a specialized electronic circuit designed to manipulate and alter memory to accelerate the creation of images in a frame buffer intended for output to a display. In general, graphics processing unit 737 is very efficient at manipulating computer graphics and image processing and has a highly parallel structure that makes it more effective than general-purpose CPUs for algorithms where processing of large blocks of data is done in parallel.

Thus, as configured herein, the processing system 700 includes processing capability in the form of processors 721, storage capability including system memory (e.g., RAM 724), and mass storage 734, input means such as keyboard 729 and mouse 730, and output capability including speaker 731 and display 735. In some aspects of the present disclosure, a portion of system memory (e.g., RAM 724) and mass storage 734 collectively store the operating system 740 to coordinate the functions of the various components shown in the processing system 700.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    detecting, by the processor, alphanumeric characters by recognizing patterns formed by dark areas of a first image file;
    converting, by the processor, the detected alphanumeric characters to a first section of a machine-encodable text and a second section of a machine encodable-text;
    detecting, by the processor, a position of the first section of the machine encodable-text, wherein detecting the position of the first section of the machine encodable-text comprises:
        generating, by the processor, a plurality of bounding boxes in the first image file,
        detecting, by the processor, features in a bounding box, of the plurality of bounding boxes, indicative of the first section of the machine encodable-text, and
        classifying, by the processor, the bounding box as including the first section of the machine encodable-text;
    detecting, by the processor, confidential information in the first section of the machine encodable-text;
    replacing, by the processor, the confidential information with generic characters;

embedding, by the processor, the first section of the first machine encodable-text with metadata describing the position of the first section of text; and reformatting, by the processor, the first section of the first machine encodable-text to conform to the position of the first section of text.

2. The computer-implemented method of claim 1, wherein converting the text from the first image file to the first machine-encodable text comprises optical character recognition.

3. The computer-implemented method of claim 1 further comprising annotating the first section of machine-encodable text via a natural language processing technique.

4. The computer-implemented method of claim 1, further comprising:
converting the first section of the first machine encodable-text to a second image file;
converting text of the second image file to a second machine-encodable text;
detecting a boundary of a subset of text from the second image file;
embedding the second machine encodable-text with metadata describing the boundary.

5. The computer-implemented method of claim 4, wherein the subset comprises a sentence.

6. The computer implemented method of claim 4, wherein detecting the boundary comprises performing a semantic analysis of text included in the second image file to determine the beginning and ending of the subset.

7. A system comprising:
a memory having computer readable instructions; and
one or more processors for executing the computer readable instructions, the computer readable instructions controlling the one or more processors to perform operations comprising:
detecting alphanumeric characters by recognizing patterns formed by dark areas of a first image file;
converting the detected alphanumeric characters to a first section of a machine-encodable text and a second section of a machine encodable-text;
detecting a position of the first section of the machine encodable-text, wherein detecting the position of the first section of the machine encodable-text comprises:
generating a plurality of bounding boxes in the first image file,
detecting features in a bounding box, of the plurality of bounding boxes, indicative of the first section of the machine encodable-text, and
classifying the bounding box as including the first section of the machine encodable-text;
detecting confidential information in the first section of the machine encodable-text;
replacing the confidential information with generic characters;
embedding the first section of the first machine encodable-text with metadata describing the position of first section; and
reformatting the first section of the machine encodable-text to conform to a position of the first section of text.

8. The system of claim 7, wherein converting the text from the first image file to the first machine-encoded text comprises optical character recognition.

9. The system of claim 7, wherein the operations further comprise annotating the first section of machine-encodable text via natural language processing techniques.

10. The system of claim 7, wherein the operations further comprise:
converting the first section of the first machine encodable-text to a second image file;
converting text of the second image file to a second machine-encodable text;
detecting a boundary of a subset of text from the second image file;
embedding the second machine encodable-text with metadata describing the boundary.

11. The system of claim 10, wherein the subset comprises a sentence.

12. The system of claim 10, wherein detecting the boundary comprises performing a semantic analysis of text included in the second image file to determine the beginning and ending of the subset.

13. A computer program product comprising a computer readable storage medium having program instructions embodied therewith, the program instructions executable by a processor to cause the processor to perform operations comprising:
detecting alphanumeric characters by recognizing patterns formed by dark areas of a first image file;
converting the detected alphanumeric characters to a first section of a machine-encodable text and a second section of a machine encodable-text;
detecting a position of the first section of the machine encodable-text, wherein detecting the position of the first section of the machine encodable-text comprises:
generating a plurality of bounding boxes in the first image file,
detecting features in a bounding box, of the plurality of bounding boxes, indicative of the first section of the machine encodable-text, and
classifying the bounding box as including the first section of the machine encodable-text;
detecting confidential information in the first section of the machine encodable-text;
replacing the confidential information with generic characters;
embedding the first section of the machine encodable-text with metadata describing the position of first section; and
reformatting the first section of the machine encodable-text to conform to a position of the first section of text.

14. The computer program product of claim 13, wherein converting the text from the first image file to machine-encodable text comprises optical character recognition.

15. The computer program product of claim 13, wherein the operations further comprise annotating the first section of machine-encodable text via natural language processing techniques.

16. The computer program product of claim 13, wherein the operations further comprise:
converting the first section of the first machine encodable-text to a second image file;
converting text of the second image file to a machine-encodable text;
detecting a boundary of a subset of text from the second image file;
embedding the second machine encodable-text with metadata describing the boundary.

17. The computer program product of claim 16, wherein the subset comprises a sentence.

* * * * *